United States Patent [19]

Scholl et al.

[11] Patent Number: 4,850,514
[45] Date of Patent: Jul. 25, 1989

[54] CONSTANT PRESSURE INTERMITTENT FLUID DISPENSER

[75] Inventors: Charles H. Scholl, Duluth; Donald J. Regan, Marietta, both of Ga.

[73] Assignee: Nordson Corporation, Westlake, Ohio

[21] Appl. No.: 450,253

[22] Filed: Dec. 16, 1982

[51] Int. Cl.⁴ .................................................. B67D 5/34
[52] U.S. Cl. .................................. 222/146.5; 222/318; 222/504
[58] Field of Search ............... 222/318, 146 HE, 504, 222/146.5

[56] References Cited

U.S. PATENT DOCUMENTS

| | | |
|---|---|---|
| Re. 27,865 | 1/1974 | Baker et al. |
| 3,184,811 | 5/1965 | Bennett et al. .............. 222/318 X |
| 3,595,204 | 7/1971 | McIntyre . |
| 4,073,408 | 2/1978 | Hartwig ........................ 222/318 X |
| 4,096,973 | 6/1978 | Checko ........................ 272/318 X |
| 4,200,207 | 4/1980 | Akers et al. ................. 222/318 X |

Primary Examiner—Charles A. Marmor
Attorney, Agent, or Firm—Wood, Herron & Evans

[57] ABSTRACT

Apparatus for intermittently dispensing substantially constant cross sectional thickness beads of molten hot melt material comprising a service block connected to a pressurized source of molten hot melt material, a dispensing gun module, and a return module. Both the dispensing gun module and the return module are mounted upon the service block, the connection being such that the inputs to both modules are received from the service block. Both the dispensing gun module and the return module have valve elements therein operable to open flow through the dispensing gun module and the return module alternatively so that the pressure of adhesive supplied to the dispensing gun module remains constant as hot melt material is dispensed from the dispensing gun module intermittently.

6 Claims, 2 Drawing Sheets

CONSTANT PRESSURE INTERMITTENT FLUID DISPENSER

BACKGROUND OF THE INVENTION

The invention relates to fluid dispensers, and in particular, to a constant pressure fluid dispenser for dispensing viscous fluids such as a molten hot melt adhesive intermittently.

In the deposition of a viscous fluid such as molten hot melt adhesive it is generally desirable to deposit the fluid in a uniform fashion. In the case of depositing a bead of adhesive in an intermittent fashion, it is desirable that each bead be consistent. Earlier equipment such as automatic hot melt dispensing guns Models AD-24 and H-20 manufactured by Nordson Corporation of Amherst, Ohio have done a satisfactory job in the intermittent deposition of a bead of molten hot melt adhesive. However, fluid pressure at the dispensing orifice is higher when the dispenser is not dispensing since the system is at a maximum output pressure so that at the commencement of each separate deposit an associated pressure drop occurs as the system is opened to atmospheric pressure. The consequence thereof being that an undesirably large bead of adhesive or "snake head" is initially deposited.

Experience has also shown that other factors can cause or contribute to the deposition of snake heads. These factors include changes in the fluid viscosity and fluid temperature, and changing of the dispensing orifice size due to clogging.

In many applications the deposition of snake heads is not desirable. Thus, it would be desirable to provide an improved fluid dispenser that dispenses viscous fluid in an intermittent fashion without experiencing pressure drops at the commencement of each separate deposit and pressure surges within the system at the finish of each deposit.

SUMMARY OF THE INVENTION

The invention is a constant pressure fluid dispenser for dispensing fluid from a pressurized source of fluid. The dispenser comprises a service block or manifold having a fluid inlet communicating with the source of fluid. The service block further includes a fluid return outlet and a fluid dispensing outlet. The fluid inlet communicates with the return outlet and dispensing outlet. A return gun module is mounted to the block so as to communicate with the return outlet. The return gun module has a return orifice. A hose places the return orifice in communication with the return side of the pressurized source.

A dispensing gun module is mounted to the block so as to communicate with the dispensing outlet. The dispensing gun module has a dispensing orifice.

A valve means, which is connected to the return and dispensing gun modules, places the dispensing gun in an "on" condition in which fluid is dispensed from the dispensing orifice or in an "off" condition in which fluid is not dispensed from the dispensing orifice. The fluid pressure at the dispensing sing orifice remains essentially constant whether the dispensing gun is in the "on" or "off" condition.

BRIEF DESCRIPTION OF THE DRAWINGS

Further objects and features of the invention will be apparent from the following description of specific embodiments of the invention in connection with the accompanying drawings. It should be understood that this description is in no way limiting and that various changes may be brought to the disclosed embodiments without department from the scope of the invention.

DETAILED DESCRIPTION OF THE SPECIFIC EMBODIMENTS

Figure 1A:
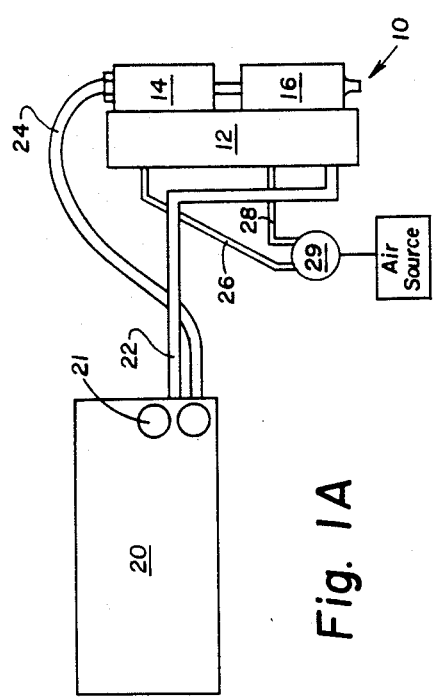
FIG. 1A is a schematic view of one specific embodiment of the invention whereby both the dispensing gun module and return gun module are directly pneumatically operated.
Figure 1B:
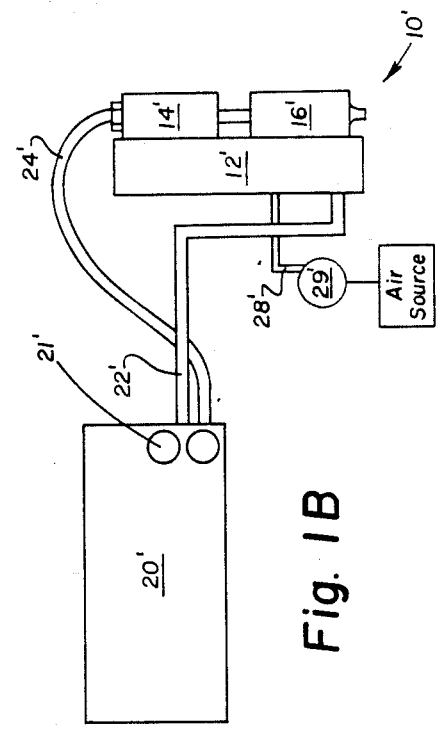
FIG. 1B is a schematic view of another specific embodiment of the invention wherein only the dispensing gun is directly pneumatically operated.

Referring to FIGS. 1A and 1B there are shown schematic drawings of two specific embodiments of the invention. In FIG. 1A the fluid dispenser generally designated 10 includes a heated service block or manifold 12, a recycle gun module 14, and a dispensing gun module 16. A pressurized hot melt adhesive source generally designated 20 is connected to service block 12 via a heated hose 22. The type of hot melt source contemplated by the specific embodiment is a hot melt unit that utilizes a gear pump 21 which can pump a constant output of hot melt adhesive. There is then provided a dedicated supply of adhesive to the dispenser by a constant displacement device such as the Model XI hot melt unit manufactured by Nordson Corporation of Amherst, Ohio.

A heated return hose 24 provides communication between recycle gun modules 14 and hot melt adhesive dispenser 20. The details of these connections will be described hereinafter. Air lines 26 and 28 supply air from an air source, controlled by a four way solenoid valve 29, to the return and dispensing gun modules 14 and 16, respectively.

With respect to FIG. 1B, the structure is generally similar to that of the embodiment illustrated in FIG. 1A but there is not an air line 26 directed to operating the recycle gun module directly. As will be evident from the description contained hereinafter, the direct operation of the dispensing gun module 16' may also function to operate recycle gun module 14'.

Figure 2:
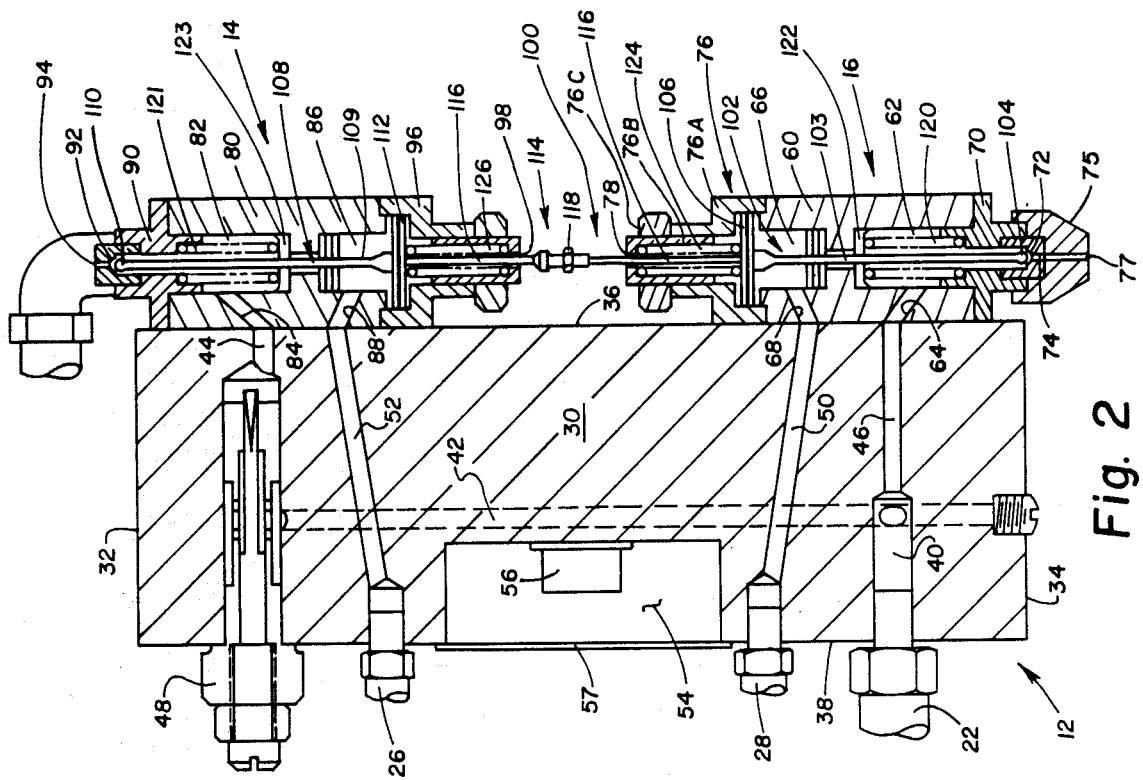
FIG. 2 is a partial cross-sectional view showing portions of the service block and gun modules of the specific embodiment illustrated in FIG. 1A.

Referring to FIG. 2, the service block 12 includes a body 30 having top 32, bottom 34, front 36 and rear 38 surfaces. An adhesive inlet port 40 is contained in the rear surface 38. Body 30 includes a longitudinal passage 42 communicating with top and bottom transverse passage 44 and 46, respectively. A flow control valve or variable restrictor 48 (such as that shown and described in U.S. Pat. No. 4,200,207 issued Apr. 29, 1980 to Akers and Scholl) is positioned within top transverse passage 44. Body 30 further includes a dispensing air passage 50 and a return air passage 52.

Body 30 also includes a temperature control well 54. A temperature control assembly 56 is mounted to block 30 within well 54. A cover plate 57 covers well 54. Although not illustrated, temperature control assembly 56 is operatively connected to a heater positioned within the service block 12 so as to control the temperature of the body 30.

Dispensing gun module 16 includes a gun body 60 having an adhesive chamber 62 wherein communication therewith is provided by an adhesive port 64. Gun body 60 also includes an air chamber 66 wherein communication therewith is provided by an air port 68. A lower cap 70 is mounted to the bottom of gun body 60 and defines in part adhesive chamber 62. Lower cap 70 includes a seat 72 attached thereto. Seat 72 includes an orifice 74. A nozzle 75 having a nozzle orifice 77 is threadedly connected to lower cap 70. An air cap assembly 76 is mounted to the top of gun body 60 and defines in part air chamber 66. Air cap assembly 76 includes an air cap body 76A, an adjustment screw 76B having an opening 78 and being threadedly connected to air cap body 76A. A jam nut 76C is threadedly connected to adjustment screw 76B.

Return gun module 14 includes a gun body 80 having an adhesive chamber 82 wherein communication therewith is provided by an adhesive port 84. Gun body 80 also includes an air chamber 86 wherein communication therewith is provided by an air port 88. A upper cap 90 is mounted to the relative top of gun body 80 and defines in part adhesive chamber 82. Upper cap 90 includes a seat 92 having a return orifice 94 therein. An air cap assembly 96 is attached to the relative bottom of gun body 80 and defines in part air chamber 86. Air cap assembly 96 includes an opening 98.

A valve assembly generally designated 100 extends between the dispensing and return gun modules. Valve assembly 100 includes a dispensing valve element 102 having a stem 103 with a ball valve 104 at one end thereof and a piston 106 at the other end thereof. The valve assembly 100 further includes a return valve element 108 having a stem 109 with a ball valve 110 at one end thereof and a piston 112 at the other end thereof.

An adapter assembly generally designated 114 connects the dispensing and return valve elements. Adapter assembly 114 includes a pair of rods 116 each having one end attached to the return and dispensing valve elements adjacent the respective pistons thereof. The other ends of the rods 116 are connected by a turnbuckle 118. Turnbuckle 118 provides an adjustment feature for valve assembly 100. The position of ball valves 104 and 110 with respect to seats 72 and 92, respectively, can be selected by adjusting turnbuckle 118. Thus, by adjusting turnbuckle 118 it can be ensured that when one gun module is closed the other is open.

Spring 124 is retained between piston 106 and adjustment screw 76B. Spring 126 is retained between piston 112 and the adjustment screw of air cap assembly 96.

Springs 120 and 121 are compressibly retained by lower cap 70 and upper cap 90, respectively. Seal assemblies 122 and 123 are energized by the spring force exerted by springs 120 and 121, respectively.

Dispensing gun module 16 is mounted to the front surface 36 of block 30 by bolts (not illustrated). Module 16 is mounted so that transverse passage 46 registers with adhesive port 64, and air passage 50 registers with air port 68. Return gun module 14 is mounted to front surface 36 of block 30 by bolts (not illustrated). Module 14 is mounted so that transverse passage 44 registers with adhesive port 84, and air passage 52 registers with air port 88.

Referring again to FIG. 2 in conjunction with the discussion of the operation of one specific embodiment, molten hot melt adhesive under pressure is supplied to fluid dispenser 10 through adhesive inlet port 40. Adhesive inlet port 40 is in communication with longitudinal passage 42. Adhesive flows from passage 42 into the top and bottom transverse passages 44 and 46. Bottom and top transverse passage 46 and 44 communicate directly with adhesive ports 64 and 84 on the dispensing and return gun modules, respectively. Adhesive then flows through ports 64 and 84 into adhesive chambers 62 and 82, respectively.

When fluid dispenser 10 is in a non-dispensing condition pressurized air is supplied to air chamber 86 and vented from air chamber 66 so as to drive piston 112 against spring 126. In turn, ball valve 104 is driven to seat on seat 72 thereby closing dispensing orifice 74 and ball valve 110 is driven away from seat 92 thereby opening return orifice 94. By opening return orifice 94, hot melt adhesive may flow through adhesive chamber 82, out return orifice 94, and back to the hot melt adhesive dispenser 20 via the heated return hose 24. By recycling molten adhesive to the source when the dispenser is in a non-dispensing condition, the fluid pressure at the dispensing orifice does not build to a level as high as it would if the recycle feature was absent. However, in order that the pressure at the dispensing orifice remain constant, whether the dispenser is in a dispense or non-dispense condition, the flow control valve 48 is adjustable to match the area of dispensing orifice 77.

In order to place the dispenser in a dispensing condition air is introduced into air chamber 66 of the dispensing gun module and vented from air chamber 86 of the return gun module. The air pressure acts on piston 106 so as to drive it against the bias of spring 124. Return valve element 108 is driven against seat 92 so that molten adhesive does not flow back to the source. Dispensing valve element 102 is driven away from seat 72 so that pressurized molten adhesive contained within chamber 62 is dispensed through dispensing orifice 47 without a pressure change through the system.

The result of applicants' invention is that during intermittent dispensation of adhesive the pressure at the dispensing orifice remains substantially constant so as to substantially reduce or eliminate pressure drops at the dispensing orifice when the dispensing gun module starts dispensation. Consequently, the bead does not have a snake head.

Figure 3:
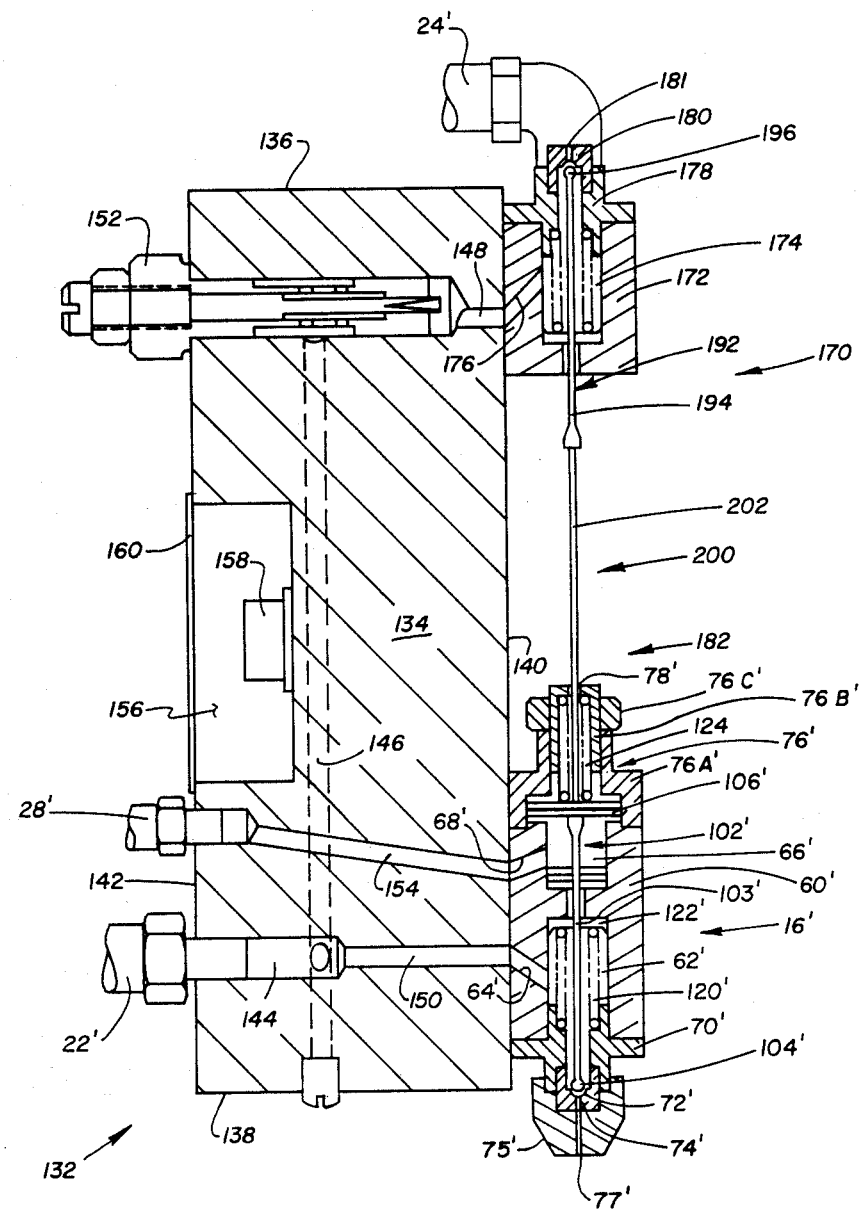
FIG. 3 is a partial cross-sectional view showing portions of the service block and gun modules of the specific embodiment in FIG. 1B.

Referring to FIG. 3, another specific embodiment of the invention is illustrated. The service block 132 includes a body 134 having top 136, bottom 138, front 140 and rear 142 surfaces. An adhesive inlet port 144 is contained in the rear surface 142. Block 134 includes a longitudinal passage 146 communicating with top and bottom transverse passages 148 and 150, respectively. A flow control valve or variable restrictor 152 is positioned within top transverse passage 148. Block 132 further includes a dispense air passage 154.

Block 134 also includes a temperature control well 156. A temperature control assembly 158 is mounted to block 134 within well 156. A cover plate 160 covers well 156. Although not illustrated, temperature control assembly 158 is operatively connected to a heater positioned within service block 132 so as to control the temperature of body 134.

The structure of the dispensing gun module 16' is similar in certain aspects to that of the dispensing gun module of the earlier-described embodiment. Dispensing gun module 16' includes a gun body 60' having an adhesive chamber 62' wherein communication therewith is provided by an adhesive port 64'. Gun body 60' also includes an air chamber 66' wherein communication therewith is provided by an air port 68'. A lower cap 70' is mounted to the bottom of gun body 60' and defines in part adhesive chamber 62'. Lower cap 70' includes a seat 72' attached thereto. Seat 72' includes an orifice 74'. A nozzle 75' having a nozzle orifice 77' is threadedly connected to lower cap 70'. An air cap assembly 76' is mounted to the top of gun body 60' and defines in part air chamber 66'. Air cap assembly 76' includes an air cap body 76A', an adjustment screw 76B' having an opening 78' and being threadedly connected to air cap body 76A'. A jam nut 76C' is threadedly connected to adjustment screw 76B'. A spring 124' is biased against piston 106' so as to urge ball valve 104' towards a closed position.

Return gun module 170 includes a gun body 172 having an adhesive chamber 174 wherein communication therewith is provided by an adhesive port 176. An upper cap 178 is mounted to the relative top of the gun body and defines in part adhesive chamber 174. Upper cap 178 includes a seat 180 having a return orifice 181 herein.

A valve assembly generally designated 182 extends between the dispensing and return gun modules. Valve assembly 182 includes a dispensing valve element 102' having a stem 103' with a ball valve 104' at one end thereof and a piston 106' at the other end thereof. Valve assembly 182 further includes a return valve element 192 having a stem 194 with the ball valve 196 at one end thereof.

An adapter assembly generally designated 200 connects the dispensing and return valve elements. Adapter assembly 200 includes a rod 202 having one end threadedly attached to the return valve element 192 and the other end is attached to the dispensing valve element adjacent the piston thereof. Due to the threaded connection between rod 202 and valve element 192, the spacing between ball valves 104' and 196 and seats 92' and 180, respectively, can be adjusted so that when the dispensing gun module is open the return gun module is closed and when the return gun module is open the dispensing gun module is closed. Spring 124' is compressively retained by adjustment screw 76B'. Spring 124' is biased against piston 106' in the dispensing gun module so as to bias dispensing ball valve 104' to a closed position and return ball valve 196 to an open position.

Dispensing gun module 16' is mounted to the front surface 140 of block 132 by bolts (not illustrated). Module 16' is mounted so that transverse passage 150 registers with adhesive port 64' and air passage 154 registers with air port 68'. Return gun module 170 is mounted to front surface 140 of block 132 by bolts (not illustrated). Module 170 is mounted so that transverse passage 148 registers with adhesive port 176.

Referring again to FIG. 3 in conjunction with the discussion of the operation of this other specific embodiment, molten hot melt adhesive under pressure is supplied to fluid dispenser 10' through adhesive inlet port 144. Adhesive inlet port 144 is in communication with longitudinal passage 146. Adhesive flows directly from port 144 into passage 150 and flows from passage 146 into the top transverse passage 148. Top and bottom transverse passage 148 and 150 communicate directly with adhesive ports 176 and 64' on the return and dispensing gun modules, respectively. Adhesive then flows through ports 64' and 176 into adhesive chambers 62' and 174, respectively.

When fluid dispenser 10' is in a non-dispensing condition, spring 124' acts against piston 106' to drive ball valve 104' to seat on seat 72' thereby closing dispensing orifice 74'. In the non-dispensing condition, spring 124' also causes ball valve 196 to be spaced apart from seat 180 thereby opening a return orifice 181. By opening return orifice 181, hot melt adhesive may flow through adhesive chamber 174, out return orifice 181, and back to the hot melt adhesive dispenser 20' via the heated return hose 24'. In the non-dispensing condition fluid pressure at the dispensing orifice remains at a generally constant level. This pressure level being somewhat lower than what the pressure would be if the recycle feature were absent. In order that the pressure at the dispensing orifice remains constant, whether the dispenser is in a dispense or non-dispense condition, the flow control valve 152 is adjustable to match the area of dispensing orifice 77'.

In order to move the dispenser from the non-dispensing to the dispensing condition, control fluid, in this case air, is introduced into air chamber 66' of the dispensing gun module. The air pressure acts on piston 106' so that it is driven against the bias of spring 124'. Return valve element 192 is driven against seat 180 so that molten adhesive does not flow back to the source. Dispensing valve element 102' is driven away from seat 72' so that pressurized molten adhesive contained within chamber 62' is dispensed through dispensing orifice 77' without any noticeable pressure change through the system.

As was the case in the earlier-described embodiment, during intermittent dispensing of adhesive the pressure at the dispensing orifice remains substantially constant so as to substantially reduce or eliminate pressure drops at the dispensing orifice when the dispensing gun module starts to dispense. Consequently, the bead that is deposited does not have a snake head.

While we have disclosed specific embodiments of our invention, persons skilled in the art to which this invention pertains will readily appreciate changes and modifications which may be made in the invention. Therefore, we do not intend to be limited except by the scope of the following appended claims.

What is claimed is:

1. An apparatus for intermittently dispensing substantially constant cross sectional thickness beads of molten hot melt material, which apparatus comprises, a source of pressurized molten hot melt material, a manifold having an inlet port communicating with said source of hot melt material, said manifold further having a pair of outlet ports communicating with said inlet port, a dispensing gun module having an inlet port connected to one of said pair of outlet ports of said manifold, said dispensing gun module having an outlet orifice through which beads of molten hot melt material are dispensed, a fluid flow passageway within said dispensing gun module, said passageway interconnecting said inlet port of said dispensing gun module to said outlet orifice, valve means contained within said dispensing gun module for controlling flow of molten hot melt material between said dispensing gun module inlet and said outlet orifice, a fluid return module having an inlet in fluid communication with the other of said pair of outlet ports of said manifold, said fluid return module having an outlet orifice and a fluid flow passageway interconnecting said inlet port of said fluid return module to said fluid return module outlet orifice, valve means contained internally of said fluid return module for controlling flow between said inlet port of said fluid return module and said outlet orifice of said fluid return module, conduit means connected to said outlet orifice of said fluid return module for returning hot melt material from said fluid return module to said source of molten hot melt material, and constant pressure means for maintaining the fluid pressure supplied to said dispensing gun module at a substantially constant pressure while said valve means of said dispensing gun module is opened and closed so as to enable substantially constant cross sectional thickness beads of hot melt material to be intermittently dispensed from the outlet orifice of said dispensing gun module, said constant pressure means comprising actuating means for simultaneously opening the valve means of said fluid return module when said valve means of said dispensing gun module is closed and for simultaneously closing said valve means of said return module when said valve means of said dispensing gun module is opened.

2. The apparatus of claim 1 in which said actuating means comprises at least one fluid motor operatively connected to both of said valve means.

3. The apparatus of claim 1 in which said actuating means comprises a pair of fluid motors, one of said pair of fluid motors being operatively connected to each of said valve means.

4. The apparatus of claim 2 wherein both of said valve means are mechanically interconnected such that one of said valve means cannot open or close without physically closing or opening the other valve means.

5. The apparatus of claim 1 in which said manifold comprises a heated service block, and service block including a flow path to said inlet of said return module, and a variable restrictor in said flow path to said inlet of said fluid return module.

6. The apparatus of claim 1 wherein said dispensing gun module and said return module are substantially identical in construction.

* * * * *

UNITED STATES PATENT AND TRADEMARK OFFICE
CERTIFICATE OF CORRECTION

PATENT NO.  : 4,850,514
DATED       : July 25, 1989
INVENTOR(S) : Charles H. Scholl, et al.

It is certified that error appears in the above-identified patent and that said Letters Patent is hereby corrected as shown below:

Column 1, line 61, delete "sing".

Column 4, line 35, "47" should be -- 74 -- .

Column 8, line 15, "and" should be -- said -- .

Signed and Sealed this

Twenty-eighth Day of May, 1991

Attest.

HARRY F. MANBECK, JR.

Attesting Officer

Commissioner of Patents and Trademarks